United States Patent
Luo et al.

(10) Patent No.: US 11,194,926 B2
(45) Date of Patent: Dec. 7, 2021

(54) INTELLIGENT AUTHORIZATION AND PROTECTION OF USER DATA

(71) Applicant: International Business Machines Corporation, Armonk, NY (US)

(72) Inventors: Lan Luo, Beijing (CN); Jian Zhang, Beijing (CN); Jian Dong Yin, Beijing (CN); Li Xia, Beijing (CN); Li Long Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 16/281,355

(22) Filed: Feb. 21, 2019

(65) Prior Publication Data
US 2020/0272756 A1    Aug. 27, 2020

(51) Int. Cl.
*G06F 21/62*    (2013.01)
(52) U.S. Cl.
CPC ........ *G06F 21/6245* (2013.01); *G06F 21/629* (2013.01)
(58) Field of Classification Search
CPC ............... G06F 21/6245; G06F 21/629; G06F 2221/2141; G06F 21/64; H04L 63/10; H04L 9/3239; H04L 2209/38
USPC .......................................................... 726/4
See application file for complete search history.

(56) References Cited

U.S. PATENT DOCUMENTS

| 2017/0032143 | A1* | 2/2017 | Kong | G06F 21/6245 |
| 2018/0060496 | A1 | 3/2018 | Bulleit et al. | |
| 2018/0307859 | A1 | 10/2018 | Lafever et al. | |
| 2020/0233938 | A1* | 7/2020 | Sirianni | H04L 63/101 |

FOREIGN PATENT DOCUMENTS

| CN | 107507091 A | 12/2017 |
| WO | 2017090041 A1 | 6/2017 |
| WO | 2017132641 A1 | 8/2017 |

OTHER PUBLICATIONS

Desai et al., "Enforceable Data Sharing Agreements Using Smart Contracts," https://arxiv.org/pdf/1804.10645.pdf, School of Computer Science, The University of Texas at Dallas, 8 pgs. accessed Nov. 2, 2018.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Jeffrey C Pwu
*Assistant Examiner* — Nega Woldemariam
(74) *Attorney, Agent, or Firm* — Jared L. Montanaro

(57) ABSTRACT

A processor may identify that an application is being downloaded to a computing device. The processor may generate an authorization that regulates data that can be used by the application. The processor may prompt a user to select a first set of addendums for the authorization. The first set of addendums indicate specific data that can be used by the application. The processor may receive a request from the application to access a first specific datum. The processor may determine whether the application is authorized to access the first specific datum.

15 Claims, 6 Drawing Sheets

INTELLIGENT AUTHORIZATION AND PROTECTION OF USER DATA

BACKGROUND

The present disclosure relates generally to the field of data security, and more specifically to tailoring the protection of a user's data to each application the user interacts with.

Personal data is rapidly becoming a huge part of daily lives and, in turn, becoming a valuable, poachable commodity. Thus, it is no surprise that disastrous data breaches are happening more frequently and people are haplessly losing their personal data. In response to such breaches, there are more and more countries building specific, coarse-grained regulations for personal data protection, such as the General Data Protection Regulation (GDPR).

SUMMARY

Embodiments of the present disclosure include a method, computer program product, and system for automatically tailoring the protection needs of a user's data to each application the user interacts with. A processor may identify that an application is being downloaded to a computing device. The processor may generate an authorization that regulates data that can be used by the application. The processor may prompt a user to select a first set of addendums for the authorization. The first set of addendums indicate specific data that can be used by the application. The processor may receive a request from the application to access a first specific datum. The processor may determine whether the application is authorized to access the first specific datum.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
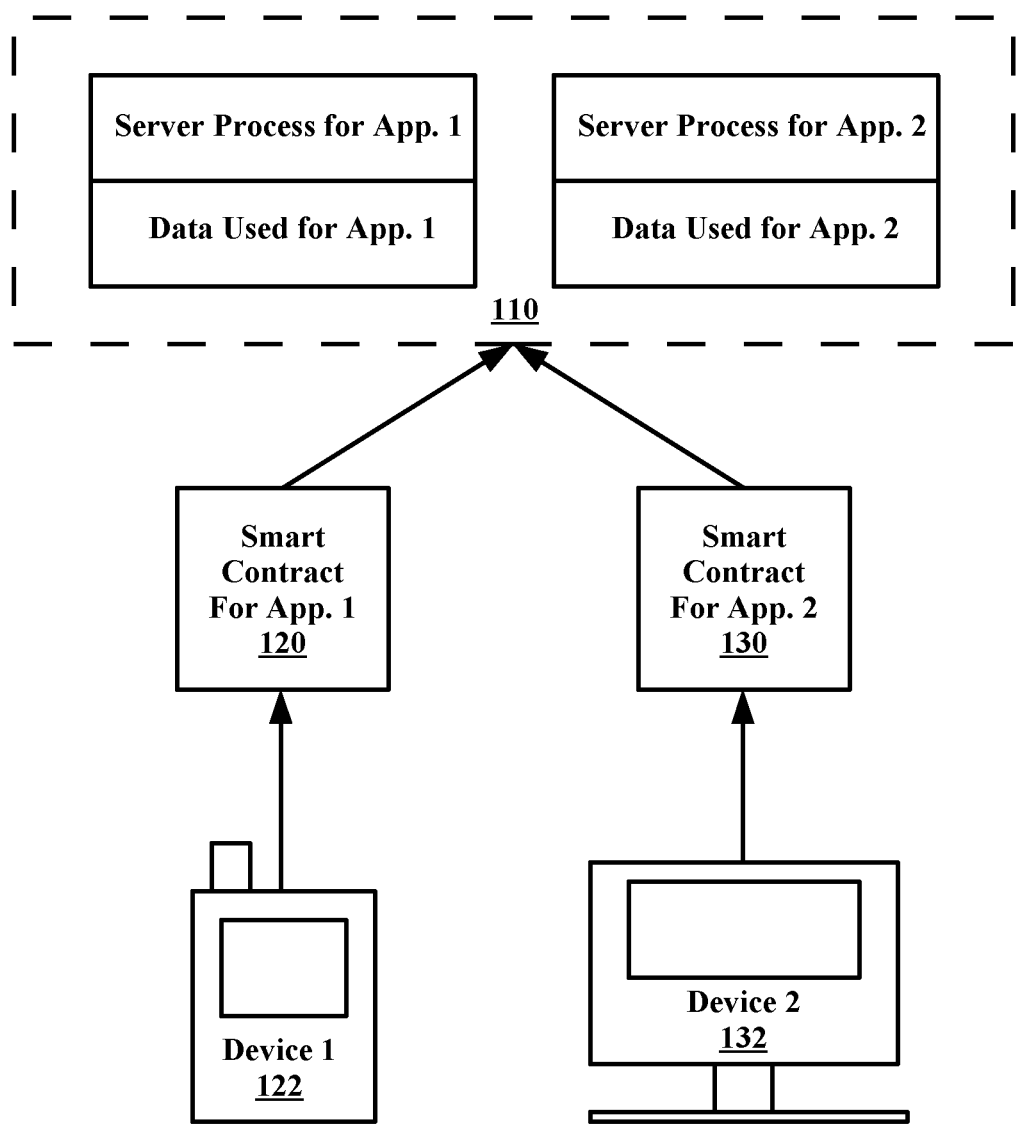
FIG. 1 illustrates an example system for authorizing and protecting a user's personal data on two different applications, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of data security, and more specifically to tailoring the protection of a user's data to each application the user interacts with. While the present disclosure is not necessarily limited to such applications, various aspects of the disclosure may be appreciated through a discussion of various examples using this context.

Many applications used today now require the input and/or use of a user's personal data (e.g., SSN, driver's license number, DOB, etc.). In order to prevent the misuse or theft of the user's personal data, many countries, organizations, and companies have begun implementing low-level, coarse-grained regulations (e.g., the GDPR obliging companies to have transparency with user information, etc.). Still though, massive data breaches and potentially malicious applications are still common. Thus a user may want a "hands-on," fine-grained way to protect their personal information.

Accordingly, in some embodiments, a processor may identify that an application is being downloaded to a computing device. The processor may generate an authorization that regulates data that can be used by the application. The processor may prompt a user to select a first set of addendums for the authorization. The first set of addendums may indicate specific data that can be used by the application. The processor may receive a request from the application to access a first specific datum. The processor may determine whether the application is authorized to access the first specific datum.

For example, a user using a desktop computer may be downloading a new word processing application. The desktop computer (or a processor/controller in the desktop computer) may identify that the new word processing application is being processed and generate a contract (e.g., authorization, smart contract, protocol, etc.) for the new word processing application. The contract, as generated, may only allow the new word processing application access to the user's first name.

The desktop computer may then, in addition to generating the contract, prompt the user to select from a generated selection window, one or more other authorizations for the new word processing application. The user may select that the new word processing application is also allowed to access the user's calendar and contacts list. The desktop computer may then store the contract with the newly selected authorizations. The desktop computer may then identify that the new word processing application is fully installed and that the user is prompting the new word processing application to run.

The desktop computer may identify that the user typed the name "Mike" into the new word processing application and that the new word processing application is asking for permission to access information regarding the user's name and the user's contact list. The desktop computer may access the stored contract and identify that the new word processing application has been authorized to access both the user's name and the user's contact list. In some embodiments, the user may select to change the original accesses/authorizations that were generated for the contract (e.g., the user may select to not allow the new word processing application access to the user's first name).

In some embodiments, determining whether the application is authorized to access the first specific datum may comprise the processor analyzing the authorization with the first set of addendums. The processor may identify the indicated specific data that can be used by the application. The indicated specific data may include the first specific datum. The processor may allow the application access to the first specific datum.

For example, a gaming application downloaded to a user's smartphone may have a smart contract that allows the gaming application access to the gyroscopic information from the smartphone, the user's in-game name, and the user's credit card number. The gaming application, when booted/opened/etc. may ask the smartphone for the information regarding the user's real name, the user's in-game name, and location information. The smartphone may then look at the smart contract and identify that the gaming application is only allowed to access/use/etc. the user's in-game name. The smartphone may then only forward the gaming application the user's in-game name.

In some embodiments, the processor may record an indication of the application access to the first specific datum on a shared archive. The shared archive may include two or more networked devices. The shared archive may include a replication of the indication on each of the two or more networked devices.

For example, when an application is allowed to use a specific piece of user data in accordance with a (smart) contract, the use of the specific data (e.g., a transaction) may be stored via blockchain, thus the (smart) contract is known by each networked device to have adequately used/processed the user's data in the agreed upon way. In some embodiments, the transaction may be indicated by a specific identifier, such as a unique transaction number so as no user information is revealed to other networked devices, but the other networked devices know of the existence of the transaction.

In some embodiments, determining whether the application is authorized to access the first specific datum may comprises the processor analyzing the authorization with the first set of addendums. The processor may identify the indicated specific data that can be used by the application. The indicated specific data may exclude the first specific datum. The processor may prohibit the application from accessing the first specific datum.

For example, a photo-editing application installed on a user's tablet may have a smart contract that allows the photo-editing application access to the tablet's camera, the tablet's photo library, and the tablet's location data. The photo-editing application, when booted/opened/etc. may ask the tablet for the information regarding the names associated with people identified in the tablet's photo library. The smartphone may then look at the smart contract and identify that the photo-editing application is only allowed to access/use/etc. the tablet's photo library and not the names associated with people identified in the tablet's photo library. The smartphone may then prohibit (e.g., stop, hinder, etc.) the photo-editing application from accessing the names associated with people identified in the tablet's photo library. It is noted that information requested by and prohibited from an application does not leave the computing device where the information and application reside, thus protecting the information from being exposed to other applications and/or external sources (e.g., other computing devices, servers, etc.).

In some embodiments, the processor may receive a second request from the application to access the first specific datum. The processor may identify that the application was previously prohibited from accessing the first specific datum. The processor may deactivate the application. Following the example above, the smartphone may identify that the photo-editing application is again trying to access the names associated with people identified in the tablet's photo library. The smartphone may again identify that the photo-editing application does not have authorization to access the names associated with people identified in the tablet's photo library and the smartphone may then delete/uninstall/disable the photo-editing application for continuing to try and access information that it is not privy.

In some embodiments, the processor may keep a running total of times that the application tries to request access to the first specific datum and after a threshold limit has been reached the processor then deactivates the application. In some embodiments, the first specific datum may include a group of data and the running total may be a total number of access requests for all of the group of data.

In some embodiments, the processor identifies that a second (e.g., third, fourth, subsequent, etc.) application is being downloaded to the computing device. The processor generates a second (e.g., third, fourth, subsequent, etc.) authorization that regulates data that can be used by the second application. The processor may prompt the user to select a second set of addendums for the second authorization. The second set of addendums indicate specific data that can be used by the second application. The processor receives a second request from the second application to access a second specific datum. The processor determines whether the second application is authorized to access the second specific datum.

For example, a user may download a music application to their smartphone and an authorization specific to the music application may be generated and augmented with addendums selected by the user. The user may then download a stereo-control application to their smartphone and a second authorization specific to the stereo-control application may be generated and augmented with addendums selected by the user. That is, each application downloaded to the user's smartphone is generated an authorization unique to that application and is augmented with addendums specifically selected by the user for that application. In some embodiments, the second application may be downloaded to a second computing device owned by the user.

In some embodiments, the processor may generate the second authorization by identifying that the first application and the second application are type-related (e.g., in a same genre of applications, such as, games, music, etc.). The processor may populate the second authorization with the first set of addendums.

For example, a user may have previously downloaded a race-car game application to their tablet and the user may have approved an authorization (with selected addendums) that allow the race-car game application access to the user's name, age, and GPS data. The user may then download a spaceship-racing game application to their tablet. The tablet may identify that the spaceship-racing game is substantially similar to the race-car game because of a tag indicating that both applications involve racing and are games. The tablet may then copy the authorization (with the selected addendums) for the race-car game application and propose it as the authorization for the spaceship-racing game application. This may allow the user to more expeditiously approve new authorizations that are related to applications previously downloaded by the user onto their computing devices. It may also allow the computing devices to more expeditiously generate authorizations and begin using newly downloaded applications.

In some embodiments, the processor may determine if the first application and second application are type-related by accessing information related to the applications name (e.g., title, etc.), category (e.g., games, music, etc.), and/or required accesses for use (e.g., use of the camera, contacts, etc.). The processor may compare each of the accessed information for the first and second applications and copy the first authorization over to the second authorization if a threshold comparison level is reached (e.g., it is determined that the applications' names both include the word "racing," are in the "games" category, and require use of a computing devices gyroscopic information).

Referring now to FIG. 1, illustrated is an example system 100 for authorizing and protecting a user's personal data on two different applications, in accordance with embodiments of the present disclosure. In some embodiments, the system 100 includes the cloud server 110, a smart contract for a first application 120, a first device 122, a smart contract for a second application 130, and a second device 132.

In some embodiments, the first device 122 identifies that a first application on the first device 122 is requesting data used for the first application (shown in the cloud server 110). In some embodiments, the data used for the first application may be a user's personal data. In some embodiments, the data used for the first application may be the executable data needed by the application to function (e.g., the first application calls the information to run properly but may not be able to access said information before being authorized by the first device 122 to use specifically requested personal user data).

The first device 122, without accessing the requested data used for the first application, contacts the smart contract for the first application 120, which may be located on the first device 122 and/or stored in a networked (e.g., blockchain, cloud computing, etc.) environment. The first device 122 analyzes the smart contract for the first application and determines whether or not the first application is allowed access to the requested data used for the first application. If it is determined that the first application is allowed to access the requested data used for the first application, the first device 122 then releases (e.g., forwards) the requested data used for the first application to a server process for the first application on the cloud server 110. The server process for the first application then utilizes the data used for the first application to run the request of the first application.

In some embodiments, if it is determined that the first application is not allowed to access the requested data, the first device 122 prohibits the first application from accessing (e.g., using, utilizing, etc.) the data used for the first application.

In some embodiments, either in parallel, or separately from the processes performed by the first device 122, the second device 132 identifies that a second application on the second device 132 is requesting data used for the second application (show in the cloud server 110). The second device 132, without accessing the requested data used for the second application, contacts the smart contract for the second application 130. The second device 132 analyzes the smart contract for the second application and determines whether or not the second application is allowed access to the requested data used for the second application. If it is determined that the second application is allowed to access the requested data used for the second application, the second device 132 then releases (e.g., forwards) the requested data used for the second application to a server process for the second application on the cloud server 110. The server process for the second application then utilizes the data used for the second application to run the request of the second application.

In some embodiments, if it is determined that the second application is not allowed to access the requested data used for the second application, the second device 132 prohibits the second application from accessing (e.g., using, utilizing, etc.) the data used for the second application. It is noted that the system presented in FIG. 1 may include more or less devices, smart contracts, and/or server processes than shown. The first device 122 and the second device 132 with separate smart contracts 120 and 130 for each of the applications on the first device 122 and second device 132 are illustrated to show each application receives a specific, tailored smart contract and should not be construed to limit the scope of the present disclosure to only include applications on different devices; applications may be housed on one computing device and each still receive a specific, tailored smart contract.

Figure 2:
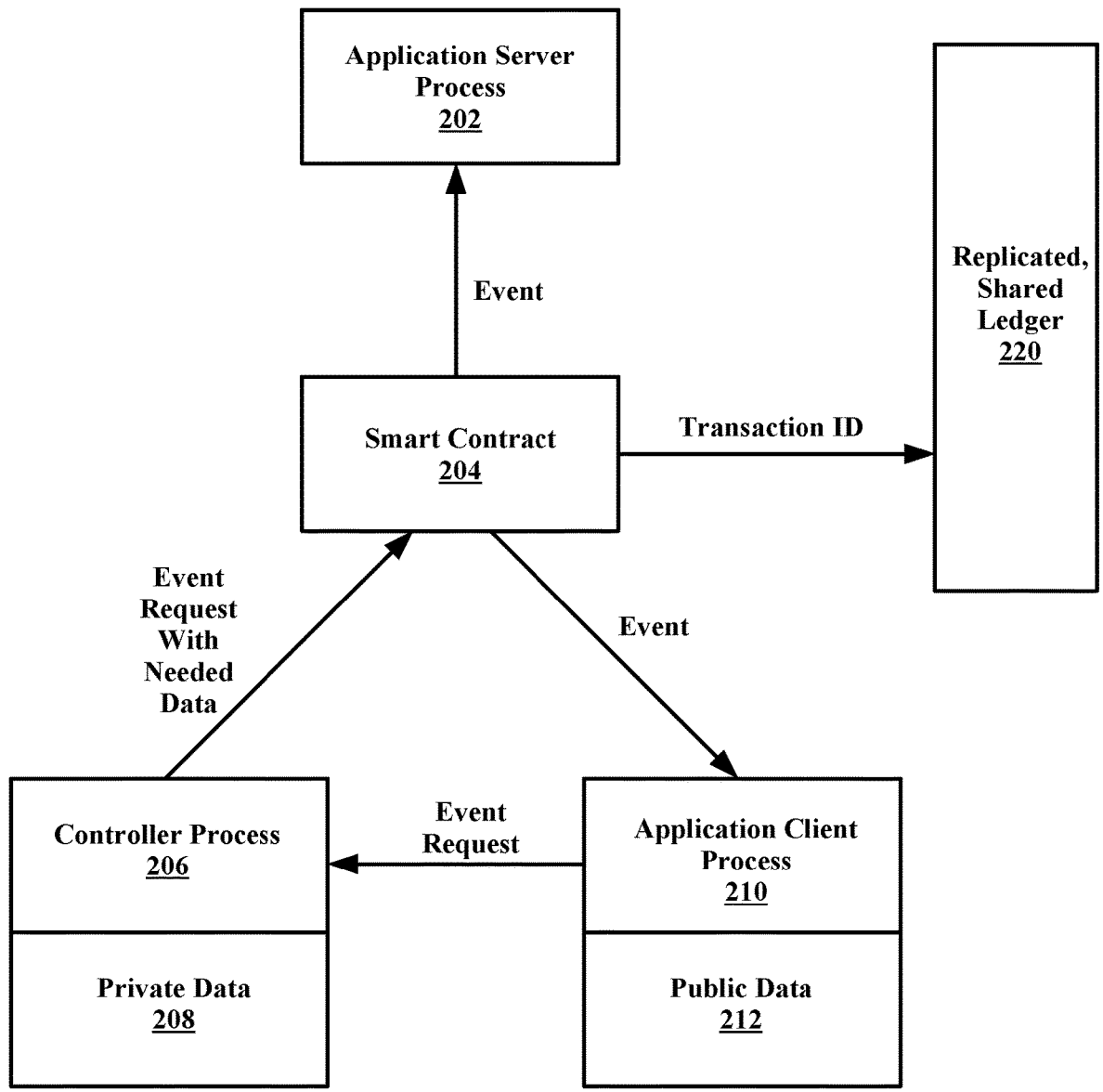
FIG. 2 illustrates an example system for determining whether an application is authorized to access a user's specific personal data, in accordance with embodiments of the present disclosure.

Referring now to FIG. 2, illustrated is an example system 200 for determining whether an application is authorized to access a user's specific personal data, in accordance with embodiments of the present disclosure. In some embodiments, the system 200 includes an application server process 202, a smart contract 204, a controller process 206, private data 208, an application client process 210, public data 212, and a replicated, shared ledger 220.

In some embodiments, the application client process 210, the public data 212, the controller process 206, and the private data 208 are housed on a common computing device. In some embodiments, the smart contract 204 is housed on the same common computing device and/or a cloud repository that is accessible to the common computing device. In some embodiments, the application server process 202 is housed in a server separate from the common computing device. In some embodiments, the replicated, shared ledger 220 is a repository that stores transactions on/about each computing device in a group of two or more networked computing devices (e.g., blockchain). In some embodiments, the common computing device is included in the group of two or more networked computing devices.

In some embodiments, the application client process 210 requests an event to happen. The event request includes a portion of the public data 212 (e.g., computing device ID, internet connection information, etc.) and a portion of the private data 208. In order to authorize the event request, the controller process 206 (e.g., using a controller on a computing device) begins to determine what specific private data of the private data 208 is required for the event (e.g., a user's SSN, a user' birthdate, etc.) and accesses the smart contract 204.

In some embodiments, the smart contract 204 was generated when the application client process 210 was originally (e.g., first) downloaded to a computing device and was augmented with addendums that a user specifically required of the application client process 210. In some embodiments, the controller process 206 identifies from the smart contract 204 that the specific private data of the private data 208 for the event is allowed to be accessed by the application client process 210. The controller process 206 releases (e.g., forwards, etc.) the specific private data of the private data 208 to the application server process 202 for processing of the event request.

In some embodiments, when controller process 206 identifies that the event is allowed to be processed with the specific private data of the private data 208, a transaction ID is generated (e.g., by the smart contract 204, the controller process 206, and/or the application client process 210) for the processing of the event request and is sent to the replicated, shared ledger 220. This confirms that the transaction actually took place and that it conformed to the rules of the smart contract 204 (e.g., only the specific private data of the private data 208 was used for the event). In some embodiments, the application server process 202 processes the event and sends the processed event back to the application client process 210 for use by a computing device.

In some embodiments, if it is identified/determined that the specific private data of the private data 208 is not authorized by the smart contract 204 to be used for the event, the controller process 206 prohibits the application client process 210 and/or the application server process 202 from accessing any portion of the private data 208. In some embodiments, the prohibiting of the application client process 210 and/or the application server process 202 from accessing any portion of the private data 208 may be recorded (e.g., added) to the replicated, shared ledger 220.

Figure 3:
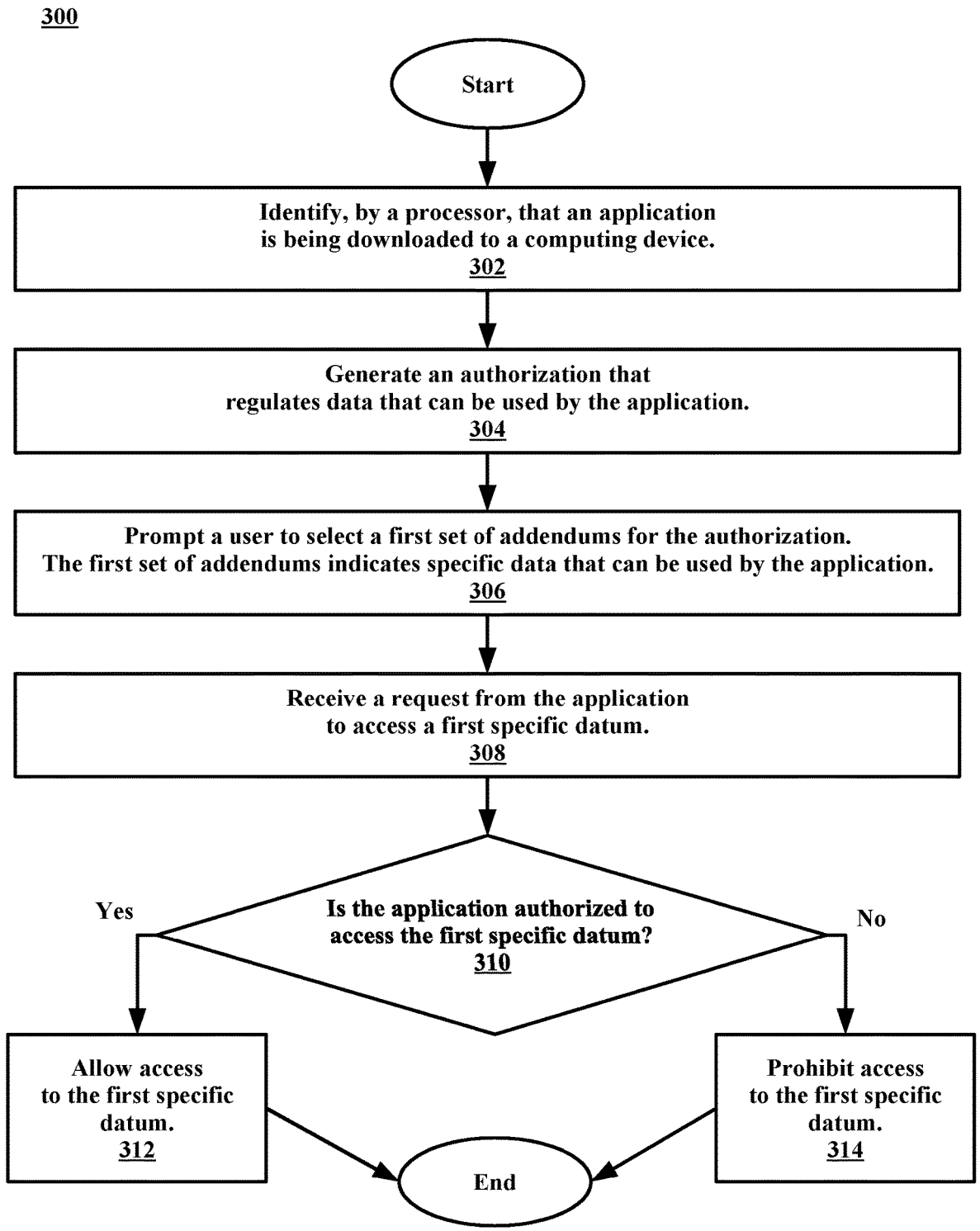
FIG. 3 illustrates a flowchart of an example method for determining if an application is authorized to access a first specific datum, in accordance with embodiments of the present disclosure.

Referring now to FIG. 3, illustrated is a flowchart of an example method 300 for determining if an application is authorized to access a first specific datum, in accordance with embodiments of the present disclosure. In some embodiments, the method 300 may be performed by a processor (e.g., on a server, a computing device, etc.). In some embodiments, the method 300 begins at operation 302 where a processor identifies that an application is being downloaded to a computing device.

In some embodiments, the method 300 proceeds to operation 304. At operation 304, the processor generates an authorization that regulates data that can be used by the application. In some embodiments, the method 300 proceeds to operation 306 where the processor prompts a user to select a first set of addendums for/to the authorization. The first set of addendums indicates specific data that can be used by the application.

In some embodiments, the method 300 proceeds to operation 308. At operation 308, the processor receives a request from the application to access a first specific datum. In some embodiments, the method 300 proceeds to decision block 310 where it is determined whether the application is authorized to access the first specific datum.

If, at decision block 310, it is determined that the application is authorized to access the first specific datum, the method 300 proceeds to operation 312. At operation 312, the processor allows the application access to the first specific datum. In some embodiments, the method 300 ends.

If, at decision block 310, it is determined that the application is not authorized to access the first specific datum, the method 300 proceeds to operation 314. At operation 314, the processor prohibits the application from access to the first specific datum. In some embodiments, the method 300 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
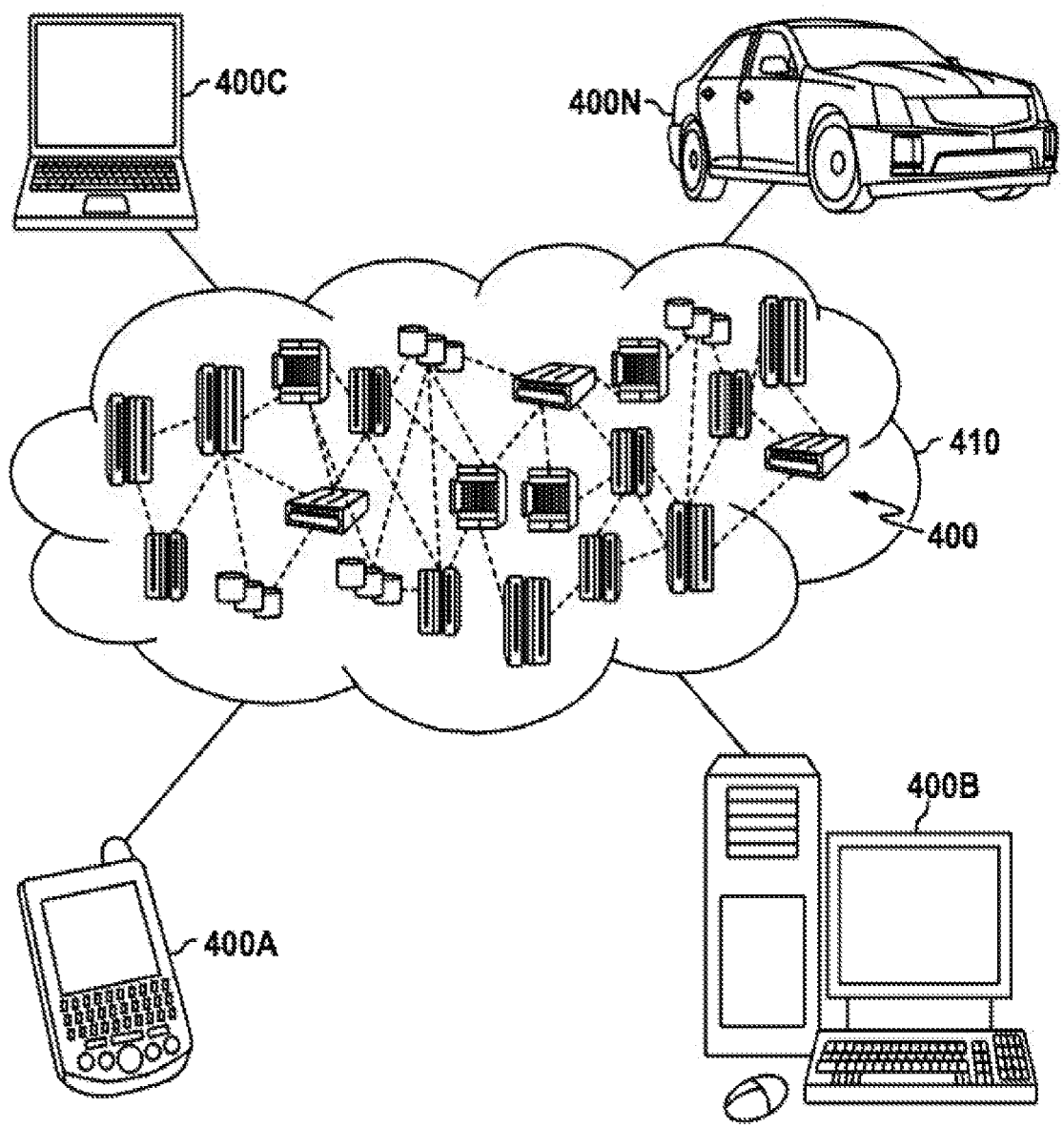
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
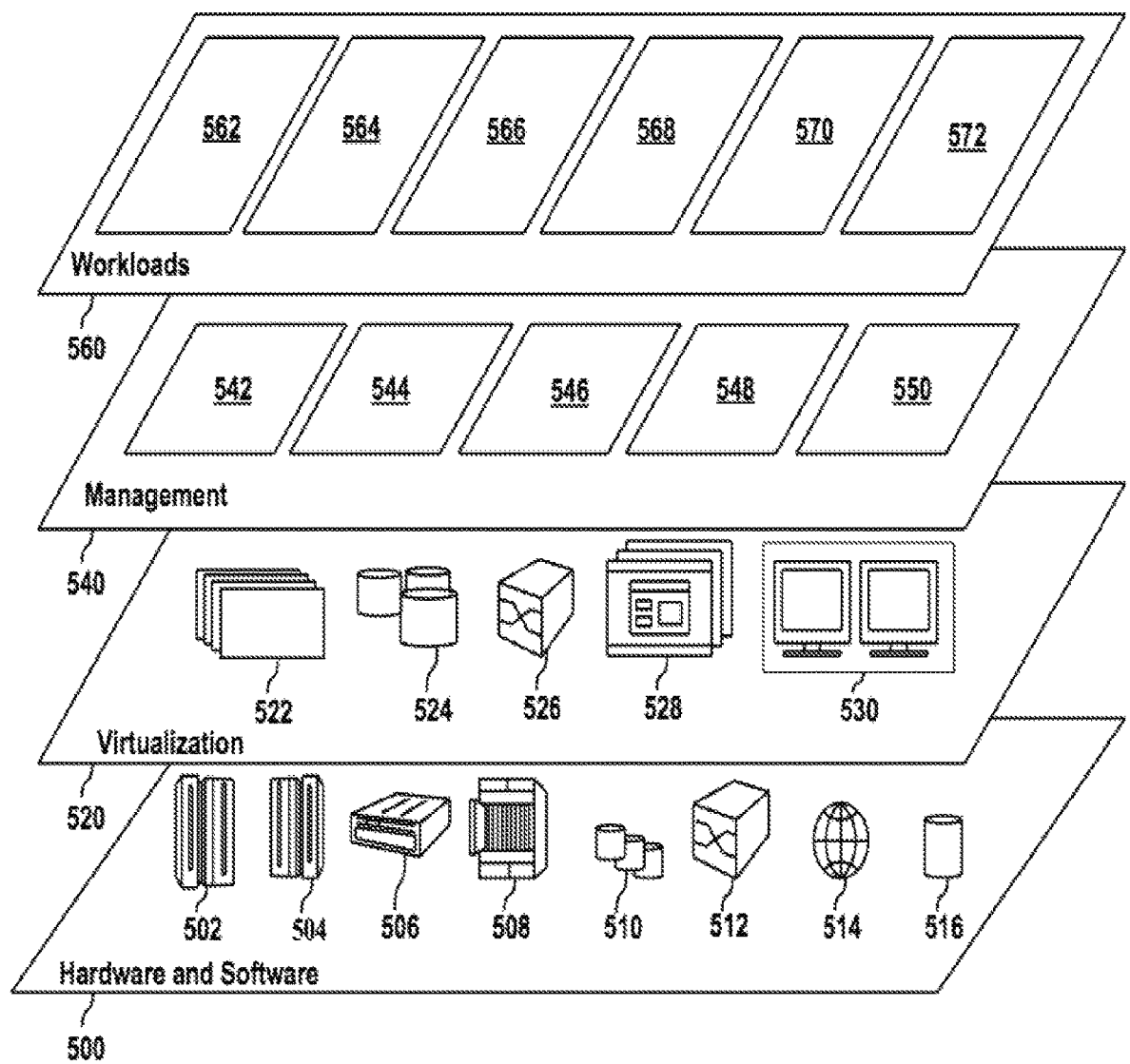
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and I/O throttling 572.

Figure 6:
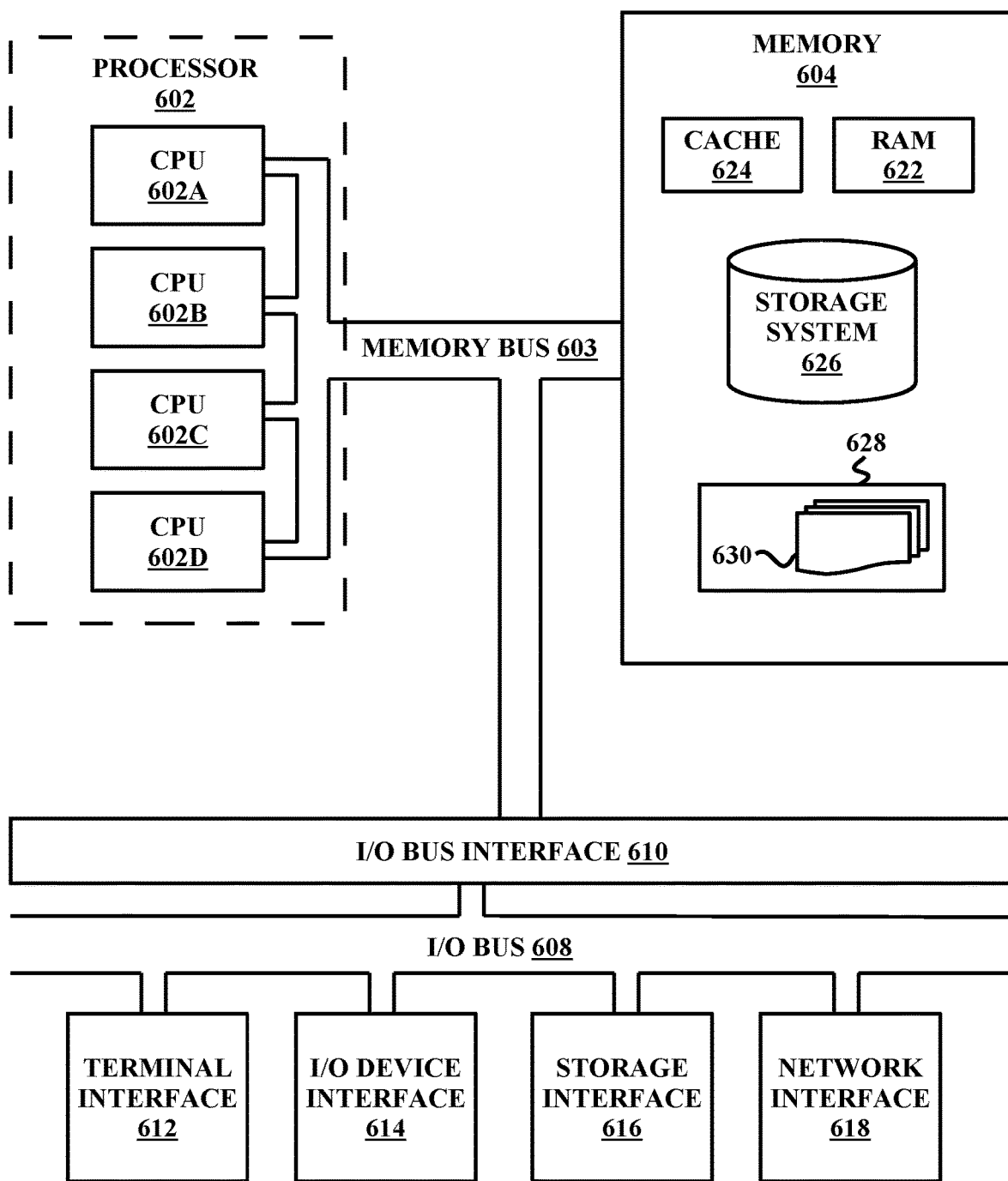
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   identifying, by a processor, that an application is being downloaded to a computing device;
   generating an authorization that regulates data that can be used by the application;
   prompting a user to select a first set of addendums for the authorization, wherein the first set of addendums indicate specific data that can be used by the application;
   receiving a request from the application to access a first specific datum;
   determining whether the application is authorized to access the first specific datum;
   identifying that a second application is being downloaded to the computing device;
   generating a second authorization that regulates data that can be used by the second application, wherein generating the second authorization comprises:
      identifying that the application and the second application are type-related, and
      populating the second authorization with the first set of addendums;
   prompting the user to select a second set of addendums for the second authorization, wherein the second set of addendums indicate specific data that can be used by the second application;
   receiving a second request from the second application to access a second specific datum; and
   determining whether the second application is authorized to access the second specific datum.

2. The method of claim 1, wherein determining whether the application is authorized to access the first specific datum comprises:
   analyzing the authorization with the first set of addendums;
   identifying the indicated specific data that can be used by the application, wherein the indicated specific data includes the first specific datum; and
   allowing the application access to the first specific datum.

3. The method of claim 2, further comprising:
   recording an indication of the application access to the first specific datum on a shared archive, wherein the shared archive includes two or more networked devices, and wherein the shared archive includes a replication of the indication on each of the two or more networked devices.

4. The method of claim 1, wherein determining whether the application is authorized to access the first specific datum comprises:
   analyzing the authorization with the first set of addendums;
   identifying the indicated specific data that can be used by the application, wherein the indicated specific data excludes the first specific datum; and
   prohibiting the application from accessing the first specific datum.

5. The method of claim 4, further comprising:
   receiving another request from the application to access the first specific datum;

identifying that that the application was previously prohibited from accessing the first specific datum; and
deactivating the application.

6. A system comprising:
a memory; and
a processor in communication with the memory, the processor being configured to perform operations comprising:
identifying, by a processor, that an application is being downloaded to a computing device;
generating an authorization that regulates data that can be used by the application;
prompting a user to select a first set of addendums for the authorization, wherein the first set of addendums indicate specific data that can be used by the application;
receiving a request from the application to access a first specific datum;
determining whether the application is authorized to access the first specific datum;
identifying that a second application is being downloaded to the computing device;
generating a second authorization that regulates data that can be used by the second application, wherein generating the second authorization comprises:
identifying that the application and the second application are type-related, and
populating the second authorization with the first set of addendums;
prompting the user to select a second set of addendums for the second authorization, wherein the second set of addendums indicate specific data that can be used by the second application;
receiving a second request from the second application to access a second specific datum; and
determining whether the second application is authorized to access the second specific datum.

7. The system of claim 6, wherein determining whether the application is authorized to access the first specific datum comprises:
analyzing the authorization with the first set of addendums;
identifying the indicated specific data that can be used by the application, wherein the indicated specific data includes the first specific datum; and
allowing the application access to the first specific datum.

8. The system of claim 7, wherein the operations further comprise:
recording an indication of the application access to the first specific datum on a shared archive, wherein the shared archive includes two or more networked devices, and wherein the shared archive includes a replication of the indication on each of the two or more networked devices.

9. The system of claim 6, wherein determining whether the application is authorized to access the first specific datum comprises:
analyzing the authorization with the first set of addendums;
identifying the indicated specific data that can be used by the application, wherein the indicated specific data excludes the first specific datum; and
prohibiting the application from accessing the first specific datum.

10. The system of claim 9, wherein the operations further comprise:
receiving another request from the application to access the first specific datum;
identifying that that the application was previously prohibited from accessing the first specific datum; and
deactivating the application.

11. A computer program product comprising a computer readable storage medium having program instructions embodied therewith, the program instructions executable by a processor to cause the processor to perform a method, the method comprising:
identifying, by a processor, that an application is being downloaded to a computing device;
generating an authorization that regulates data that can be used by the application;
prompting a user to select a first set of addendums for the authorization, wherein the first set of addendums indicate specific data that can be used by the application;
receiving a request from the application to access a first specific datum; and
determining whether the application is authorized to access the first specific datum;
identifying that a second application is being downloaded to the computing device;
generating a second authorization that regulates data that can be used by the second application, wherein generating the second authorization comprises:
identifying that the application and the second application are type-related, and
populating the second authorization with the first set of addendums;
prompting the user to select a second set of addendums for the second authorization, wherein the second set of addendums indicate specific data that can be used by the second application;
receiving a second request from the second application to access a second specific datum; and
determining whether the second application is authorized to access the second specific datum.

12. The method of claim 11, wherein determining whether the application is authorized to access the first specific datum comprises:
analyzing the authorization with the first set of addendums;
identifying the indicated specific data that can be used by the application, wherein the indicated specific data includes the first specific datum; and
allowing the application access to the first specific datum.

13. The method of claim 12, further comprising:
recording an indication of the application access to the first specific datum on a shared archive, wherein the shared archive includes two or more networked devices, and wherein the shared archive includes a replication of the indication on each of the two or more networked devices.

14. The method of claim 11, wherein determining whether the application is authorized to access the first specific datum comprises:
analyzing the authorization with the first set of addendums;
identifying the indicated specific data that can be used by the application, wherein the indicated specific data excludes the first specific datum; and
prohibiting the application from accessing the first specific datum.

15. The method of claim 14, further comprising:
receiving another request from the application to access the first specific datum;
identifying that that the application was previously prohibited from accessing the first specific datum; and
deactivating the application.

* * * * *